March 14, 1961  J. S. MILLER  2,974,548
AUTOMATIC DRILLING MACHINE
Filed Dec. 9, 1958  5 Sheets-Sheet 1

INVENTOR
JOHN S. MILLER
BY Francis J. Klempay
ATTORNEY

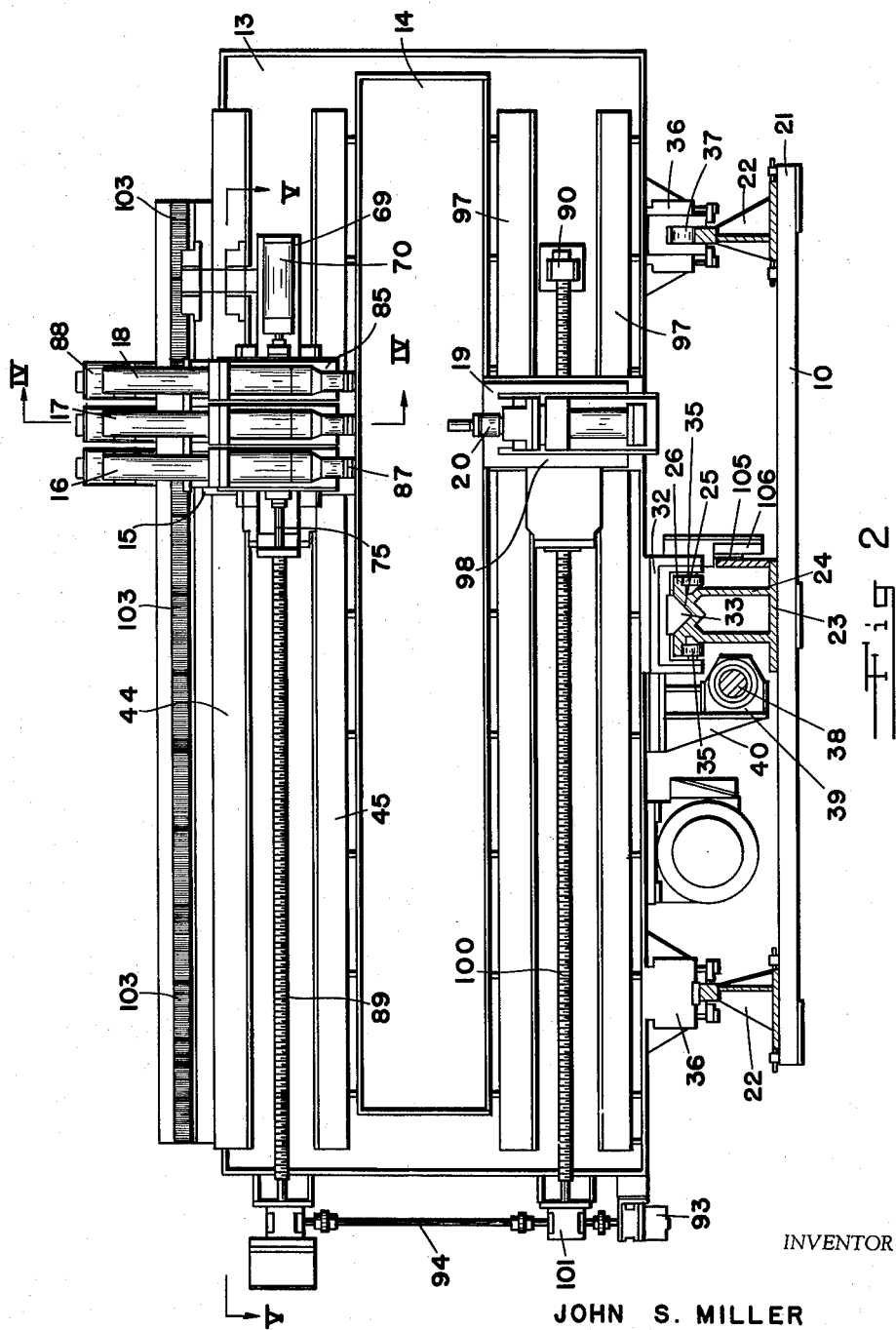

March 14, 1961  J. S. MILLER  2,974,548
AUTOMATIC DRILLING MACHINE
Filed Dec. 9, 1958  5 Sheets-Sheet 3
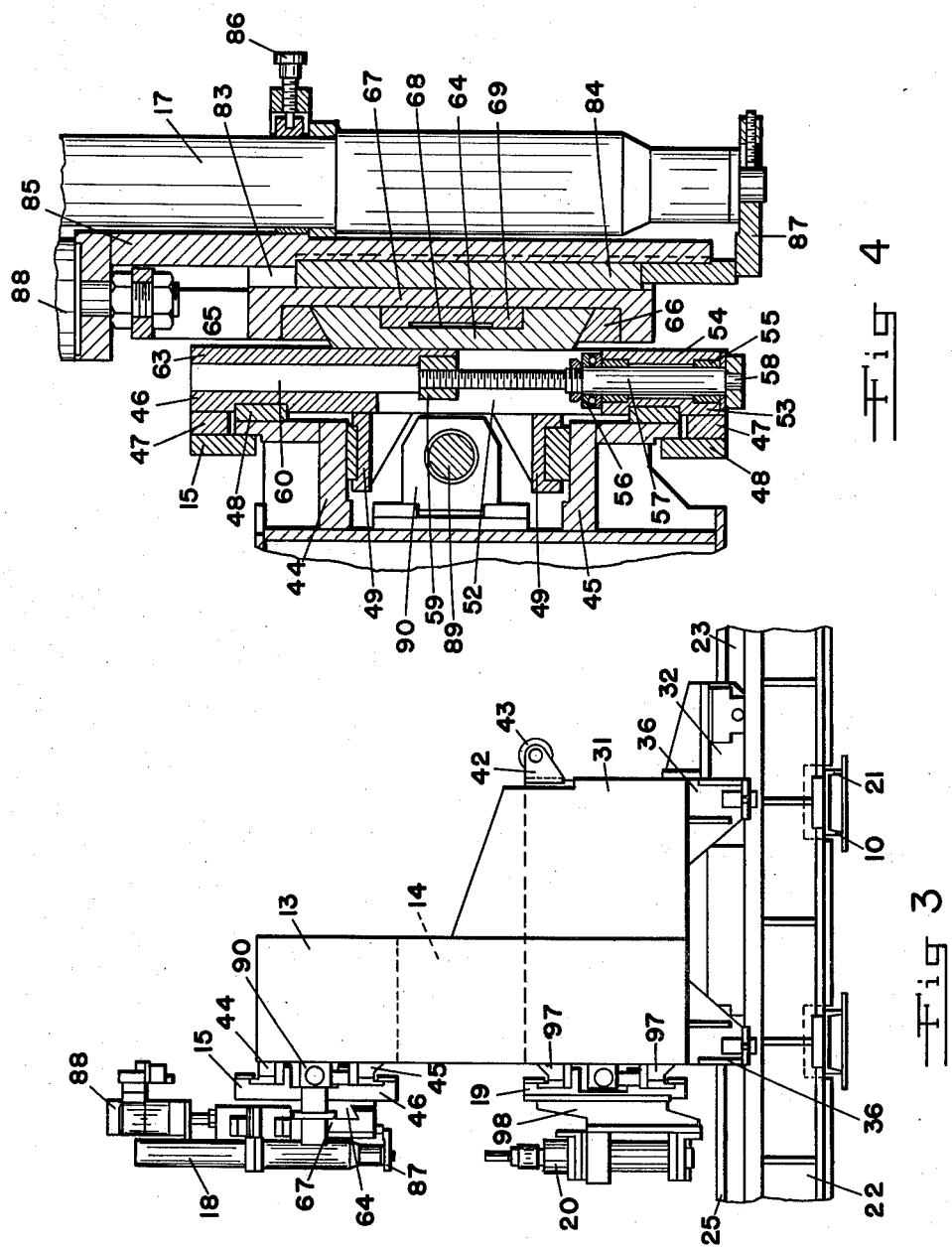
INVENTOR
JOHN S. MILLER
BY *Francis J. Klempay*
ATTORNEY

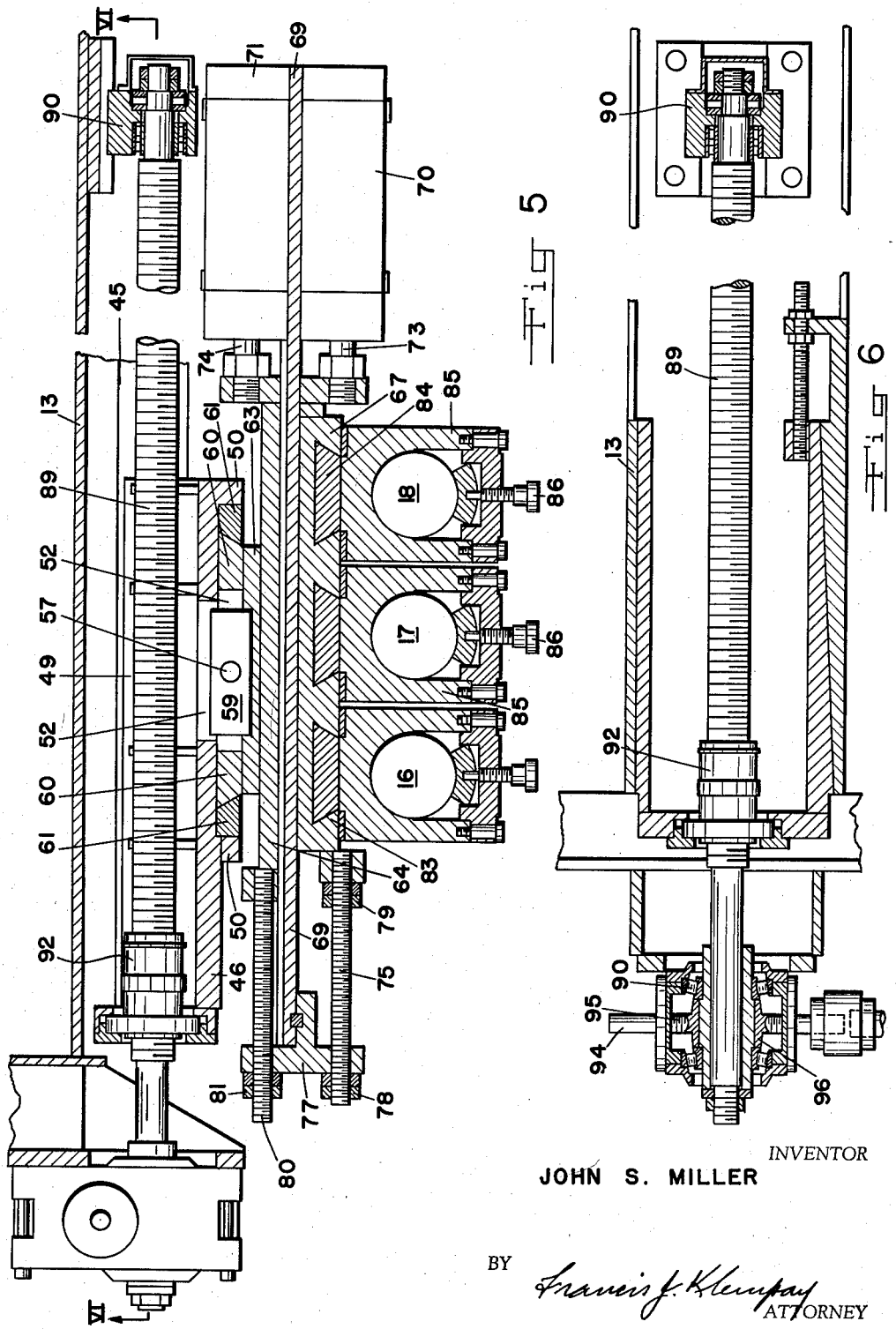

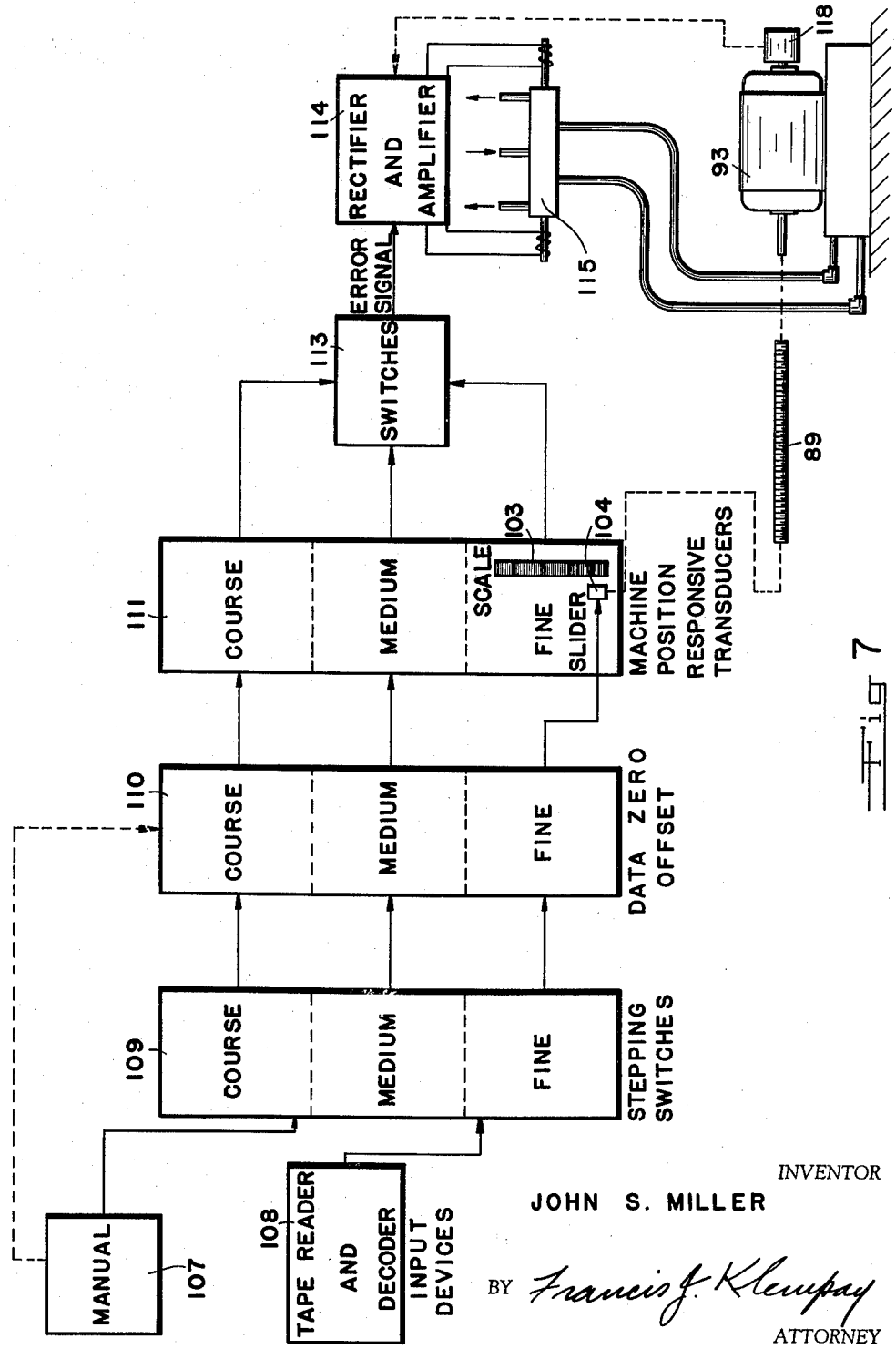

United States Patent Office 2,974,548
Patented Mar. 14, 1961

2,974,548

AUTOMATIC DRILLING MACHINE

John S. Miller, Youngstown, Ohio, assignor to The McKay Machine Company, Youngstown, Ohio, a corporation of Ohio Filed Dec. 9, 1958, Ser. No. 779,224

20 Claims. (Cl. 77—5)

The present invention relates generally to the construction of machine tools and more particularly to the provision of a machine tool which is adapted for automatic or semi-automatic control and which is capable of performing a wide variety of machining operations on cumbersome and extremely large area workpieces in a highly accurate and very precise manner. Thus, the machine tool of the present invention may be used for operations such as drilling, reaming, routing, tapping, counterboring, etc. on various large area workpieces, such as large sheets or plates as employed in aeroplane fuselages, electric generators and the like. Also, the machine tool of the present invention is ideally adapted for use with automatic control equipment whereby the desired tool units are moved in a highly efficient and very precise manner between successive tool working points in accordance with a predetermined and preselected pattern which is fed into the automatic control equipment. Although the machine tool disclosed in the following specification and accompanying drawing is specifically intended for completing drilling and/or counterboring operations, it should be clearly understood that the teachings of the present invention are equally applicable to other types of machine tools as will be apparent to those skilled in this particular art.

It is the primary or ultimate object of the present invention to provide a drilling machine of a type ideally adapted for automatic control and which is capable of performing drilling operations on large area workpieces in a highly accurate manner. For example, the automatic drilling machine shown in the accompanying drawing which is constructed in accordance with the teachings of the present invention is adapted to receive workpieces having a maximum length dimension of sixteen feet and a maximum width dimension of eight feet and is adapted to drill or counterbore holes therein to accuracies of within thousandths of an inch.

A further object of the invention is to provide an automatic drilling machine which is so constructed that the large and cumbersome plates or sheets may be placed and clamped thereon with ease. As will be hereinafter more fully explained, the automatic drilling machine comprises a large and extremely rigid generally rectangular workpiece supporting table and a drill gantry which is movable longitudinally along the workpiece supporting table. The drill gantry supports a transversely movable drill mounting carriage and in this manner all portions of a workpiece supported on the workpiece supporting table may be exposed to the drill units. The arrangement is such that the drill gantry can be retracted to one end of the workpiece supporting table whereby this table is completely exposed for the loading of workpieces thereon by means of overhead cranes or the like.

Another object of the present invention is to provide simplified and highly accurate means for slidably guiding the drill gantry during its travel along the workpiece supporting table. The drill gantry must be very accurately guided during its movement if accuracies within the range indicated are to be obtained and the present drilling machine embodies a simplified V-shaped track or rail on the supporting base which is engaged by a cooperating slide and anti-friction rollers mounted on the drill gantry.

A further object of the invention is to provide improved means for moving the drill gantry along the workpiece supporting table and improved means for moving the drill mounting carriage transversely along the gantry whereby the drill units may be positioned with respect to the workpieces in a highly accurate manner. These means for moving comprise very accurately ground screws and ball follower assemblies whereby there is no overtravel or backlash in the means for moving.

Another important object of the invention is the provision of supporting the drill gantry and the workpiece supporting table against deflection. As will be understood, the problem of deflection is very serious in heavy machine tools of the type adapted for working on large workpieces where high accuracy is required. In the present instance the supporting base is provided with a pair of spaced parallel rails which support the opposite ends of the drill gantry and the arrangement is such that the drill gantry and the rails of the supporting base form a rigid beam-like support. The drill gantry carries a transversely extending back-up roll which engages the underside of the workpiece supporting table and in this manner the workpiece supporting table is backed up against deflection adjacent the working area of the drill units regardless of the position of the drill gantry with respect to the workpiece supporting table.

Yet another object of the invention is to provide a machine of the character described embodying a plurality of drill units and employing new and novel means for indexing a preselected drill unit into drilling position. The drill units are mounted in side-by-side relation on a drill slide carried by the transversely movable drill mounting carriage and new and novel apparatus is employed for accurately moving the drill slide to move the desired drill unit into proper drilling position.

A further object of the invention is to provide a drill backer unit for cooperation with the drill units and improved interconnected drive means for moving the drill backer unit on the drill gantry in exact synchronism with the drill mounting carriage in order that the same is always properly positioned with respect to the operative drill unit.

Still another important object of the invention is to provide a drilling machine of the type disclosed above which embodies improved means for determining the exact position of the operative drill unit with respect to a predetermined reference point on a workpiece in a highly accurate manner. This last mentioned means comprises a plurality of accurately wound and spaced wires mounted on the drill gantry and the supporting base which are passed over by slides mounted on the drill mounting carriage and the drill gantry, respectively, whereby the magnetic fields between the slides and the windings sets up electrical signals which, in combination with other control equipment, determine the positions of the drill mounting carriage and the drill gantry to within tolerances of ten thousandths of an inch.

Yet another object of the invention is to provide improved means for controlling the actuation of the means for moving the drill gantry and the drill mounting carriage whereby the drill units are moved between successive working points in a very fast and very accurate manner. In this respect the means for moving are actuated by fluid motors which are in turn controlled by servo valves. The servo valves are controlled by suitable control instrumentalities whereby the fluid motors have predetermined maximum outputs during large movements of the drill gantry and the drill mounting carriage and then have progressively decreasing outputs as the preselected drill unit approaches the next working point on the workpiece.

The above, as well as other objects and advantages of the present invention, will become more apparent upon consideration of the following specification and accompanying drawing wherein there is disclosed a preferred embodiment of invention.

In the drawing:

Figure 2 is a front sectional view showing specifically the construction of the drill gantry and the means employed for mounting and supporting the same from the supporting base;

Figure 3 is a fragmentary end view of the automatic drilling machine depicted in Figure 1;

Figure 4 is a side fragmentary sectional view taken along the section line IV—IV of Figure 2 showing specifically the means employed for movably mounting the drill units on the drill gantry;

Figure 5 is a plan sectional view showing the mounting of the drill units on the drill gantry as seen from the section line V—V of Figure 2;

Figure 6 is a front sectional view depicting the driving arrangement used to move either the drill mounting carriage or the drill backer carriage on the gantry as taken along the section line VI—VI of Figure 5; and Figure 7 is a schematic circuit diagram of a portion of the control equipment which may be employed for controlling the automatic drililng machine of the present invention.

Figure 1:
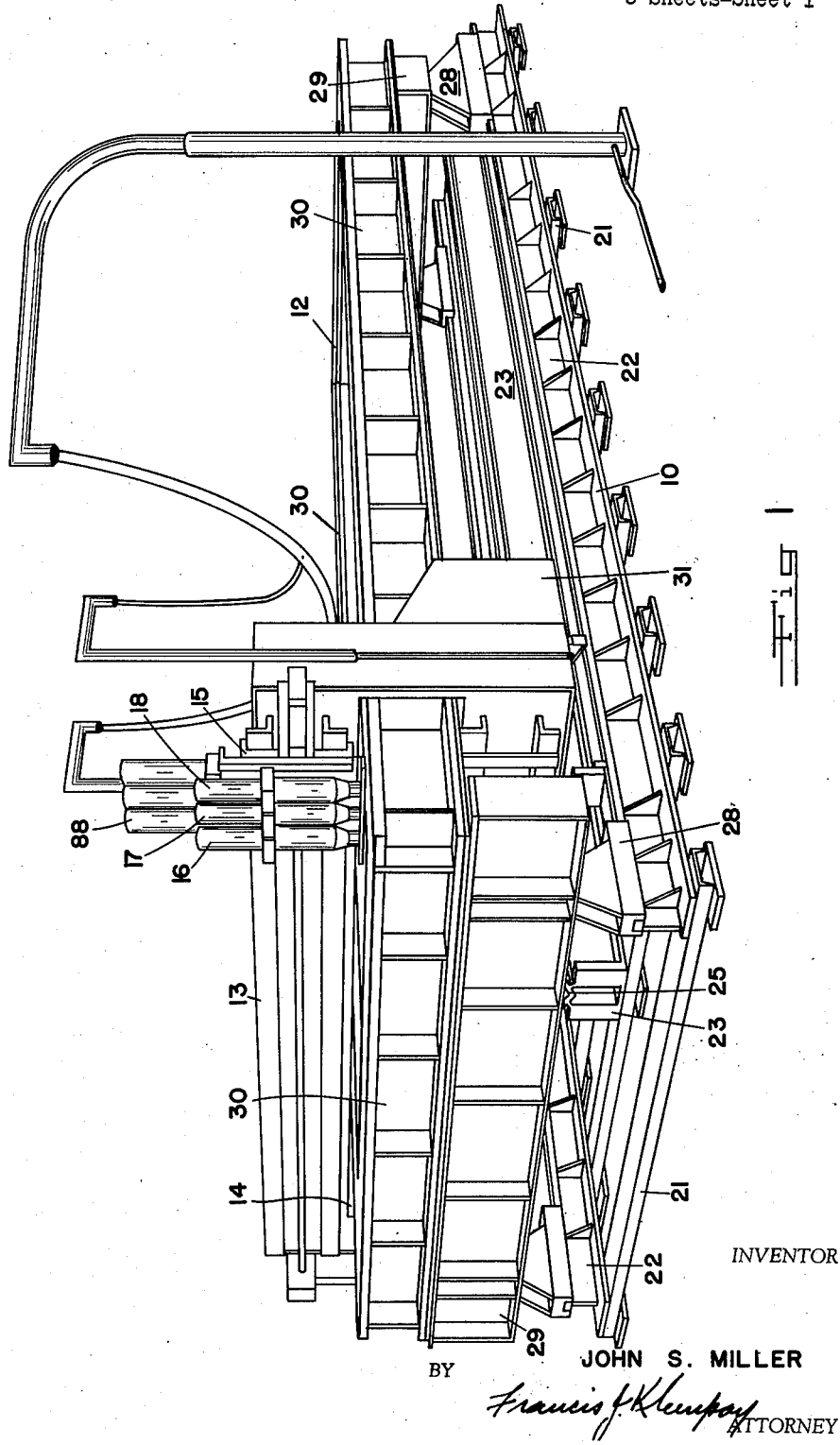
Figure 1 is a front perspective view of an automatic drilling machine constructed in accordance with the teachings of the present invention.

Referring now to the drawing, and initially to Figures 1–3 thereof, there is shown an automatic drilling machine adapted to compelte very accurate drilling operations on large area workpieces in a fast and efficient manner constructed in accordance with the teachings of the present invention. The automatic drilling machine is shown to comprise a rigid supporting base, generally designated by the reference numeral 10, which supports a large rectangular workpiece table 12. Mounted for very accurately guided sliding movement on the supporting base 10 is a large rectangular drill gantry 13 having an opening 14 therein for the passage of the workpiece receiving table 10. The drill gantry carries a movable drill mounting carriage 15 which in turn supports a plurality on vertically disposed individual drill units 16–18. Also mounted on the drill gantry but below the workpiece receiving table is a drill backer mounting carriage 19 that supports a drill backer unit 20. It will be noted that the drill gantry is movable along the workpiece receiving table on a first axis of movement while the drill units and the drill backer unit are movable along the drill gantry on an axis that is disposed normally to the axis of movement of the gantry.

The general overall operation of the automatic drilling machine is that a workpiece is first properly positioned and then is clamped on the workpiece receiving table 12. The drill gantry 13 is then moved along the workpiece receiving table 12 while the drill mounting carriage 15 and the drill backer mounting carriage 19 are moved in synchronism along the drill gantry until a selected working point on the workpiece is exposed to the drill units 16–18 and the drill backer unit 20. Then the desired one of the drill units is energized to complete the machining operation at the selected working point. The drill gantry 13, the drill mounting carriage 15 and the drill backer mounting carriage 19 are again moved until another preselected working point is exposed to the drill and drill backer units for completing another machining operation. This sequence of operations continues until all of the desired working points on the workpiece have been exposed to and machined by the cooperating drill units and the backer unit. Then the drill gantry is moved to one end of the workpiece supporting table whereby the properly machined workpiece can be unclamped and removed from the automatic drilling machine. As will be hereinafter more fully apparent, the automatic drilling machine of the present invention embodies improved means for mounting and driving the drill gantry, the drill mounting carriage and the drill backer mounting carriage, for supporting the workpiece receiving table, for indexing the preselected one of the drill units into operative relation with respect to the drill backer unit, for determining the position of the drill units with respect to a reference point on the workpiece and for controlling the movement of the drill gantry, drill mounting carriage and drill backer mounting carriage.

The supporting base 10 comprises a plurality of spaced transversely extending channel shaped structural members 21 which have bolted thereto adjacent their ends a pair of longitudinally extending elongated beam-like rails 22. Also mounted on the channel shaped structural members and positioned between the beam-like side rails is a center rail 23 having a pair of depending leg portions 24 and an upper edge portion defining a longitudinally extending V-shaped groove 25 which terminates in outwardly directed flanges 26 in the manner shown in Figure 2 of the drawing. Each of the rails is mounted on the structural members 21 in exact parallel alignment with respect to each of the other rails and the V-shaped groove 25 and the surfaces of the flanges 26 are very accurately machined in relation to each other to provide very accurate bearing surfaces throughout the length of the center rail 23. It will be noted that the surfaces of the V-shaped groove 25 and the flanges 26 on the center rail 23 are such that the same are adapted to be very accurately machined on a large planer whereby these surface are accurate with respect to each other throughout their length. It is preferred that the surfaces of the V-shaped groove 25 be lined with edge grain formica or other wear resistant material to provide hard bearing surfaces. As will be hereinafter more fully explained, the center rail 23 forms a portion of the means employed for accurately guiding and keeping the drill gantry 13 in alignment during longitudinal movement thereof while the side rails 22 serve as a portion of the means employed for supporting the drill gantry 13 for longitudinal movement and preventing deflection thereof in the transverse direction adjacent its ends.

Mounted in nesting relation over the ends of each of the side rails 22 are a pair of triangularly shaped supporting brackets 28. The longitudinally spaced pairs of the supporting brackets 28 are spanned by transversely extending cross tie structural members 29 which in turn serve as supports for the large longitudinally extending workpiece receiving table 12. The workpiece receiving table 12 is constructed from a plurality of beam-like frame members 30 and has a large center opening therein for the reception workpieces to be machined. It will be noted that the workpiece receiving table is approximately the same size as the supporting base 10 and that the interlaced construction employing the cross tie structural members 29 provides a simplified arrangement for rigidly supporting the workpiece receiving table in vertically spaced relation with respect to the supporting base. Clamping means, not shown, are preferably mounted along the edges of the frame members 30 forming the workpiece receiving table for gripping and holding the edges of a workpiece. Any conventional type of clamps may be employed as is readily apparent.

Considering now the construction of the drill gantry 13 and the various apparatus carried thereby, the drill gantry, as previously intimated, comprises a properly fabricated rigid and generally rectangular structural frame having a rearwardly extending portion 31 adjacent the bottom thereof and which has the large rectangular opening 14 extending therethrough. The drill gantry is supported and guided for very accurate longitudinal movement with respect to the supporting base 10 with the workpiece supporting table 12 projecting through the rectangular opening 14 whereby the drill gantry is free to move longitudinally relative to the workpiece supporting table. Mounted on the bottom surface of the drill gantry intermediate the ends thereof is the longitudinally extending mounting bracket 32 which in turn carries an accurately machined V-shaped slide 33 in the channel defined thereby. The V-shaped slide 33 is of appreciable longitudinal length and is adapted to be received within the V-shaped groove 25 machined on the upper surface of the center rail 23 whereby large sliding contact areas are provided between the inwardly converging surfaces of the slide and the upwardly and outwardly converging bearing surfaces of the groove. In this manner of construction any turning movement of the drill gantry with respect to the supporting base or the workpiece receiving table is effectively resisted. The V-shaped slide 33 is adapted to be machined on a planer, whereby the inwardly converging surfaces of this member can be accurately machined with respect to each other and with respect to the upwardly and outwardly diverging bearing surfaces of the V-shaped groove 25. The arrangement is such that the drill gantry is very accurately guided for movement along the supporting base and the workpiece receiving table.

To support the weight of the drill gantry and to allow free sliding movement of the V-shaped slide 33 with respect to the V-shaped grove 25, the U-shaped mounting bracket 32 mounts adjacent the ends of each of its leg portions an axle journaling an anti-friction roller 35. Thus, there are provided longitudinally spaced pairs of the anti-friction rollers 35 which, as clearly shown in Figure 2 of the drawing, are adapted to have rolling contact with the bottom surfaces of the outwardly directed flanges 26 at the top of the center rail 23. The anti-friction rollers 35 are preloaded to support a portion of the weight of the drill gantry whereby the same is adapted for relatively friction free movement along the supporting base.

The drill gantry is also supported adjacent its ends for sliding movement on the side rails 22 and this is accomplished by providing a pair of longitudinally spaced generally U-shaped trunnions 36 on each side of the drill gantry on the bottom surface thereof. Each of the trunnions 36 mounts an anti-friction roller 37 which is adapted to have rolling contact with the upper surface of one of the side rails 22. The overall arrangement is such that the drill gantry is accurately guided by the V-shaped groove 25 cooperating with the V-shaped slide 33 and the four anti-friction rollers 35 while the weight of the drill gantry is supported by these members and the anti-friction rollers 37. The anti-friction rollers 37 do not perform any guiding function but serve as a means, in combination with the other rollers and the cooperating groove and slide, of supporting the drill gantry for relatively friction free movement in the longitudinal direction. Of particular importance is the fact that the anti-friction rollers 37 are positioned adjacent the sides of the drill gantry whereby any deflection of the drill gantry in the transverse direction is resisted. Also, the side rails 22, the anti-friction rollers 37, the trunnions 36, the sides and top of the drill gantry and the supporting base form a rectangular beam-like structure whereby the drill gantry is very rigidly supported and guided as is a prerequisite to performing drilling operations within the accuracies contemplated by the present invention.

For moving the drill gantry along the supporting base there is provided a very accurately ground relatively large diametered screw 38 which extends the length of and is journaled by the supporting base 10 intermediate the side edges thereof closely adjacent the center rail 23. Engaging the screw 38 is a ball follower assembly 39 which is mounted on the underside of the drill gantry from a supporting bracket 40. Ball follower assemblies for screws are well known in the art to comprise a plurality of balls which engage and ride in the groove of a screw and, as such, form no part of the present invention. The arrangement is that upon proper rotation of the screw 38 by a fluid motor, not specifically shown, the drill gantry will move longitudinally along the supporting base and the workpiece receiving table with the ball follower assembly preventing overtravel or backlash of the drill gantry. In this manner the drill gantry can be very accurately moved and positioned along the supporting base and workpiece supporting table. The means for automatically controlling the fluid motor will be hereinafter more fully explained.

Extending from the rear of the drill gantry immediately below the rectangular opening 14 are a pair of spaced brackets 42 (see Figure 3 of the drawing) which define a mounting clevis for journaling a transversely extending elongated back-up roll 43. This roll is adapted to have rolling contact with the bottom surfaces of the frame members 30 comprising the workpiece receiving table whereby this table is backed-up against deflection in the transverse direction. This arrangement is particularly advantageous since the back-up roll 43 travels with the drill gantry to backup the workpiece supporting table at a point closely adjacent the drilling operations at all times without interfering with the movement of the drill gantry in any manner. Deflection of the workpiece supporting table adjacent any given working point is eliminated whereby drilling operations within the accuracies contemplated are obtainable.

Mounted on the forward face of the drill gantry 13 above the rectangular opening 14 therein are a pair of elongated transversely extending and vertically spaced angles 44 and 45 whose leg portions define outwardly projecting guides for slidably receiving and guiding the drill mounting carriage 15. The drill mounting carriage 15 comprises an elongated vertically extending carriage member 46 whose upper and lower rear edge surfaces mount suitable spacer blocks 47 and wear resistant slide blocks 48 that define opposed inwardly directed channels which are received in nesting relation over the leg portions of the guide angles 44 and 45. A pair of vertically spaced gusseted guide block assemblies 49 are also mounted on the rear face of the carriage member 46 for engaging the adjacent faces of the guide angles 44 and 45. The arrangement is such that the carriage member 46 is rigidly supported for easy sliding movement along the guide angles in a direction normal to the direction of movement of the drill gantry.

As is more fully shown in Figures 5 and 6 of the drawing, the elongated vertically extending carriage member 46 has a pair of forwardly extending transversely spaced vertical projections 50 adjacent the right end thereof and a relatively large opening 52 of appreciable vertical dimension positioned between the forwardly extending vertical projections 50. Mounted in the bottom of the opening 52 is an insert 53 which is centrally bored at 54 and is lined with annular bushings 55. Rotably supported by the bushings 55 and an annular bearing 56 mounted on the upper surface of the insert 53 in axial alignment with the bore 54 is the lower end portion of a vertically extending shaft 57 whose extreme lower end projects downwardly from the insert 53 to provide an accessible stub 58 for rotating this shaft. The upper end portion of the shaft 57 is threaded throughout its length and threadably received thereon is a rectangular lifting nut 59. Attached to the sides of the rectangular lifting nut 59 are a pair of laterally projecting slides 60 whose angled ends are slidably received within angled ways defined by a pair of way blocks 61 mounted on the inwardly facing surfaces of the outwardly extending vertical direction with the slides 60 riding in the angled ways defined by the way blocks 61. The construction is such that the drill units and the ancillary equipment associated therewith are adjustable en masse toward and away from the drill backer unit 20 and the workpiece receiving table.

Mounted on the forward face of and carried by the rectangular lifting nut 59 is a drill slide assembly which comprises a separator 63 and a relatively stationary drill slide guide 64. The drill slide guide 64 is of considerable transverse length and has a generally trapezoidal cross section whose upper and lower beveled edges 65 form angled bearing surfaces for wear resistant angled slides 66 mounted on a generally U-shaped relatively movable drill slide 67. The relatively stationary drill slide guide 64 has a channel shaped depression 68 in the outer face thereof which, in cooperation with the rear face of the movable drill slide 67, forms a rectangular opening for the reception of a relatively movable cylinder mounting member 69. As shown in the drawing, the movable cylinder mounting member 69 extends transversely further than either the relatively stationary drill slide guide 64 or the relatively movable drill slide 67 and mounts on the right end and on the opposite sides thereof a pair of fluid drill unit indexing cylinders 70 and 71. As will be hereinafter more fully apparent, the fluid drill unit indexing cylinder 70, which has its piston rod 73 connected in driving relation with the relatively movable drill slide 67, is adapted upon proper actuation thereof to index the drill units 16–18 to the left while the fluid drill unit indexing cylinder 71, whose piston rod 74 is connected to the relatively stationary drill slide guide 64, is adapted upon proper actuation thereof to shift the drill units to the right from the position shown in the drawing. The arrangement in such that the drill unit 18 is moved into operative position when the cylinder 70 is actuated and the drill unit 16 is moved into operative position when the cylinder 71 is actuated. Of particular importance in this construction is the arrangement whereby when the cylinder 71 is actuated the piston rod thereof remains in a fixed position while the cylinder housing moves along with the cylinder mounting member 69 and the cylinder 70 which is carried by the cylinder mounting member. This allows considerable conservation of space and area necessary for the drill mounting carriage and provides a compact nesting assembly well adapted for the use intended.

The left end of the movable drill slide 67 carries a laterally projecting threaded rod 75 which extends through a suitable aperture provided in one leg of a T-shaped stop plate 77 that is mounted from the cylinder mounting member 69. Threadably received on the rod 75 are pairs of adjustable limiting nuts 78 and 79 disposed on opposite sides of the T-shaped stop plate 77. The innermost pair of limiting nuts 78 provide an adjustable abutment stop for limiting indexing movement of both of the drill units 16 and 18 while the limiting nuts 79 limit return movement of the drill units to the right when the cylinder 70 is so energized. A second threaded rod 80 is provided which is attached to the movable cylinder mounting member 69 and extends through a suitable aperture provided in the other leg portion of the T-shaped stop plate 77. A pair of adjustable limiting nuts 81 are threadably received on the rod 80 and form a means of limiting return movement of the drill units to the left when the cylinder 71 is energized to return the drill units to their original position. The drill slide assembly is ideally suited for the automatic drilling machine of the present invention since it is possible to position any of the three drill units very accurately in operative relation with respect to a given vertical reference axis on the drill gantry. In the various views of the drawing the drill unit 17 is shown in operative drilling position. Of particular importance is the arrangement whereby the limiting nuts 79 and one face of the T-shaped stop plate 77 limit the movement of both the drill units 16 and 18 into operative drilling position and the compact nesting construction of the drill slide assembly.

As shown particularly in Figure 5 of the drawing, the transversely movable drill slide 67 has three dove tailed ways 83 machined in the forward face thereof which slidably receive the dove tailed slides 84. The dove tailed slides are attached to the rear faces of drill unit mounting blocks 85 having generally U-shaped recessess therein for receiving the drill units 16–18. Each of the drill units is tightly clamped in the recess in its corresponding drill unit mounting block by a thumb screw 86 while attached to the lower end of each of the dove tailed slides 84 is an L-shaped clamp 87 having a forwardly projecting foot portion which is adapted to engage and clamp the workpiece during drilling operations and having an aperture therein to allow the passage of the drilling tool or bit. A fluid clamping cylinder 88 is provided for each of the drill units and has its driven element connected to the drill unit mounting block 85 whereby upon proper actuation thereof the preselected individual drill unit that is in operative drilling position and the clamp 87 associated therewith may be lowered into clamping relation with a workpiece clamped on the workpiece supporting table. The drill units are of the well known air operated type embodying control means to limit the vertical travel of the drilling tool or bit for accurate counterboring operations, etc. and as such form no part of the present invention.

Reviewing briefly the operation and function of the drill mounting carriage 15, it should be apparent that the entire carriage assembly is movable transversely on the drill gantry 15 with the spacer blocks 47, slide blocks 48 and guide block assemblies 49 slidably engaging the angles 44 and 45. The drill units are adjustable vertically en bloc upon rotation of the shaft 57 whereby the angled slides 60 attached to the lifting nut 59 ride in vertical ways formed on the carriage member 46 to adjust the position of the drill units with respect to the backer drill unit 20 and the workpiece. The drill units are also mounted for very accurate transverse movement to allow the selected drill unit for any given drilling operation to be indexed into operative drilling position upon proper actuation of the fluid drill unit indexing cylinders 70 and 71. Each of the drill units independently vertically movable by the clamping cylinder 88 associated therewith to move the L-shaped clamp 87 into engagement with the workpiece and, of course, the drilling tools or bits in the drill units are rotatable and vertically movable in a very accurate manner.

For moving the drill mounting carriage along the drill gantry in a very accurate manner there is provided an elongated and very accurately ground fine pitch screw 89 which extends across the drill gantry and is positioned between the guide angles 44 and 45. The ends of the screw 89 are journaled in suitable bearing assemblies 90 mounted at the side of the drill gantry and the threads of the screw are engaged by a ball follower assembly 92 which is attached to the left end of the carriage member 46 whereby upon rotation of the screw 89 the drill mounting carriage is caused to move along the drill gantry with the screw and ball follower assembly allowing very accurate positioning of the drill mounting carriage. The driving screw 89 is adapted to be rotated by a fluid motor 93 mounted on the drill gantry through suitable drive mechanism including a vertical shaft 94 and a worm gear 95 meshing with an annular gear 96 mounted on the end of the screw 89. The drill mounting carriage will therefore move in response to actuation of the fluid motor 93 and control apparatus for actuating this fluid motor will be hereinafter more fully explained.

Considering now the general arrangement of and the means employed for moving the drill backer mounting carriage 19 and the drill backer unit 20, there are attached to the forward face of the drill gantry 13 below the large rectangular opening 14 and the workpiece supporting table a pair of outwardly directed vertically spaced transversely extending angles 97 which define guides for slidably mounting a carriage member 98.

Mounted on the forward face of the carriage member 98 is the drill backer unit 20 which is of conventional construction, being vertically movable and adjustable and adapted to back up the workpiece at the working point during drilling operations. For transversely moving the drill backer carriage 19 there is provided an elongated drive screw 100 which is identical to the screw 89 and is adapted to be engaged by a ball follower assembly in exactly the same manner as the screw 89. The mounting and journaling of the drive screw 100 is identical with that of the drive screw 89 and to avoid repetition in the specification such mounting will not be described again. The screw 100 is connected by suitable worm and annular gears contained in a gear housing 101 to the vertical shaft 94 whereby this screw is also driven by the fluid motor 93. It should be apparent that the arrangement is such that both the screw 89 and the screw 100 will be driven in exact synchronism in order that the drill mounting carriage 15 and the drill backer carriage 19 will aways move together while the drill backer unit aligned with the operative one of the drill units.

As previously intimated, the drilling machine of the present invention is ideally suited for employment with automatic control apparatus. Any automatic control apparatus must be capable of positioning the drill gantry with respect to the workpiece supporting table and the drill mounting carriage with respect to the drill gantry. Thus, the drill gantry moves along one axis while the drill mounting carriage moves along an axis disposed normally with respect to this first mentioned axis to expose any point on the surface of a workpiece held on the workpiece supporting table. Any control must be of the two axis type—that is, capable of controlling the movement of the drill gantry and the drill mounting unit along their respective normally disposed axes. It will be noted that any point on the workpiece supporting table can be expressed in terms of two linear coordinates with respect to these two axes. Also, any automatic control must be responsive to the instantaneous position of the operative drill unit in order that the drill unit may be moved to a series of working points in a minimum of time. And, above all, any automatic control must be capable of great accuracy if the inherent accuracies designed into the drilling machine of the present invention are to be fully realized in completing accurate drilling operations.

The movement of the drill gantry and the drill mounting carriage can be controlled by regulating the fluid supplied to the fluid motors which are employed to drive the screws 38 and 89, respectively, that in turn drive the drill gantry and drill mounting carriage through the ball follower assemblies 39 and 92. As a portion of the means employed for determining the instantaneous position of the drill mounting carriage along the drill gantry, there are provided a plurality of transversely aligned scale units 103 which are mounted from a suitable support along the top edge of the drill gantry as shown in Figure 2 of the drawing. A slider unit 104 (see Figure 7) is mounted on the drill mounting carriage in slightly spaced but adjacent relation with respect to the scale units whereby the slide unit is adapted to move relative to the stationarily mounted scale units upon movement of the drill mounting carriage. Each of the scale units 103 comprises a plurality of very accurately spaced turns of fine wire while the slide unit 104 also comprises a plurality of very accurately spaced turns of wire. The turns of wire on the scale units and the slide form, in effect, an air gap transformer and the current induced in the winding on the slide changes in proportion to the movement between the windings as the carriage moves across the drill gantry. Such an arrangement is known in the art to provide very accurate and precise position responsive signals and is commercially available under the trademark "Inductosyn." For determining the position of the drill gantry with respect to the supporting base and the workpiece receiving table a similar series of scale units 105 are mounted on one side of the center rail 23 of the supporting base while a depending slide 106 is attached to the mouting bracket 32 and is therefore movable with the drill gantry to determine very accurately the instantaneous position thereof. The direct mounting of these particular precise position measuring devices on the surfaces of the machines is particularly advantageous in that very high accuracies in the drilling operations are obtained.

The control for automatically positioning the selected drill unit with respect to a working point does not, in itself, form a part of the present invention as obviously many types and designs of control apparatus may be employed with the automatic drilling machine. However, for a complete understanding of the operation and overall functioning of the present apparatus a representative control will now be described.

As set forth above, any working point on the workpiece receiving table can be resolved into coordinates related to the axes of movement of the drill gantry and the drill mounting carriage. A similar control is preferably utilized for controlling the movement of these components of the drilling machine and only one such control will be described. Such a control for the drill mounting carriage is depicted schematically in Figure 7 of the drawing and comprises manual and automatic input devices indicated by the reference numerals 107 and 108, respectively. The manual input device may comprise a plurality of hand set dials while the automatic input device consists of a tape reader and decoder for accepting information punched upon tape and converting the same into appropriate signals. The use of punched tape is particularly advantageous in that the same can be prepared and checked prior to the commencement of drilling operations and in that the drilling machine may be used to the full extent of its capacity.

Regardless of the type of input device being employed at any particular time, the same generates signals which correspond to a particular desired working point on the workpiece receiving table and that portion of the signals relating to the desired position of the drill mounting carriage is transferred to stepping switches 109. The stepping switches 109 are arranged to provide three independent desired position indicating assemblies—labeled as coarse, medium and fine in the drawing—which are adapted to convert the signals received from the input devices into analogous voltages corresponding to the desired position of the drill mounting carriage for the next drilling operation. Each of the independent desired position indicating assemblies is adapted to generate a signal covering a predetermined dimension range in predetermined steps and within desired accuracies. Thus, the coarse independent desired position indicating assembly may cover dimensions from zero to two hundred inches in steps of one inch within accuracies of plus or minus four-tenths of an inch, the medium desired position indicating assembly may cover a range from zero to ten inches in hundredths of an inch steps within accuracies of plus or minus one-thousandth of an inch and the fine desired position indicating assembly is preferably adapted to cover dimensions from zero to one-tenth of an inch in steps of one-thousandth of an inch to within accuracies of plus or minus one ten-thousandths of an inch. The stepping switches 109 take the signals received from the input devices and converts them into independent voltage signals representing the desired position of the drill mounting carriage on the machine in steps varying from one-thousandth of an inch to two hundred inches.

The independent signals from the stepping switches 109 are fed through a data zero offset unit 110 and then to corresponding coarse, medium and fine instantaneous drill mounting carriage position responsive transducers 111. The transducers 111 are attached to the machine and have the function of sensing and determining the instantaneous position of the drill mounting carriage with respect to a preselected reference point on the workpiece receiving table. Preferably the medium and coarse instantaneous drill mounting carriage position responsive transducers are mechanical resolvers which are geared directly to the drive for the screw 89 while the fine instantaneous machine position transducer is the very precise and accurately measuring "Inductosyn" unit made up on the scales 103 and the slider 104 as above described. The capacity and the accuracy of the three position responsive transducers are selected to match the dimensions and accuracies represented by the independent stepped signal supplied by the stepping switches 109 and it will be noted that the fine transducer is adapted to very accurately determine the instantaneous position of the drill mounting carriage along the drill gantry. The instantaneous drill mounting carriage position responsive transducers are arranged in such a manner that error signals are produced if the drill mounting carriage is not in the desired position. Thus, if the instantaneous position of the drill mounting carriage is different from the desired position of the drill mounting carriage three independent error signals representing and proportional to such difference will be produced.

The data zero offset unit 110 is provided for changing the reference or base point on the workpiece receiving table. By manipulating suitable controls mounted in the control panel housing the manual input device it is possible for the operator to shift the reference point from which the instantaneous drill mounting carriage position responsive transducers are controlled. This is advantageous in that the operator can shift the reference point to accommodate different sized workpieces and different patterns of drilling operations whereby the machine is most effectively utilized.

The error signals from the instantaneous drill mounting carriage position responsive transducers 111 are next directed to a plurality of switches 113 and then to a rectifier and amplifier assembly 114 which blend the three error signal together to produce a control signal for actuating a fluid servo valve 115 for controlling the flow of fluid to the fluid motor 93. The switches 113 are arranged so that when the difference between the desired position and the instantaneous position of the drill mounting carriage varies by more than three inches the coarse error signal is in control to actuate the servo valve in such a manner to drive the fluid motor 93 at a predetermined maximum rate. This causes the screw 98 to turn thereby moving the drill mounting carriage at a maximum rate toward the desired position as determined by the input devices and the stepping switches. When the drill mounting carriage is less than three inches but more than three-hundredths of an inch from the desired position the switches 113 are energized in such a manner that the medium error signal gains control and actuates the fluid servo valve 115 so that the fluid motor 93 continues to drive the drill mounting carriage toward the desired position at a reduced rate of speed. Then as the drill mounting carriage moves to less than three-hundredths of an inch from the desired position the fine error signal assumes command to actuate the servo valve in a manner whereby the drill mounting carriage is slowly moved into the desired position. The servo valve, as is well known in the art, is essentially a proportioning device for metering fluid between the inlet and outlet ports thereof. For stability purposes, a tachometer 118 is mounted directly on the fluid motor 93 and is operative to feed back voltages proportional to the velocity of the drill mounting carriage into the driving stage of the servo valve 115.

It should be apparent that the fluid motor is controlled by the servo valve to rotate the screw 89 and move the drill mounting carriage to first reduce the coarse error signal to less than a preset minimum, then reduce the medium error signal to less than a lower preset minimum and then to reduce the fine error signal to zero. In this manner the drill mounting carriage will be moved in a minimum of time from one position to another along the drill mounting carriage since the control apparatus is operative to move the drill mounting carriage at a maximum rate to effect large movements thereof and then to progressively decrease the rate of movement of the drill mounting carriage whereby the same is traveling quite slowly by the time it reaches the desired position so that the same can be accurately and easily stopped. In addition, the provision of the coarse, medium and fine channels in the control apparatus is such that only the fine channel need be designed to control the movement of the drill mounting carriage within the accuracy required although the overall functioning of the control is to very accurately position the drill mounting carriage.

It is preferred that the control means for the drill mounting carriage also embody means for actuating the fluid cylinders 70 and 71 through suitable control instrumentalities, not shown. Thus, the input devices would also feed into the control apparatus a signal or signals indicating which of the drill units 16-18 is to be employed at each of the working points. This signal is used to control fluid valves in the supply circuits of the fluid drill unit indexing cylinders 70 and 71 in order that the preselected drill unit is moved into operative position as the drill mounting carriage moves between working points. Also, the control means may incorporate means for controlling the vertical movement of the individual drill bits or tools for tapping and counterboring operations, for example. Of course, it would be possible to replace the drill units with other types of machining units and to provide control apparatus designed for very accurately controlling the vertical positioning thereof whereby a three axis control arrangement is provided and the machine is adapted for profiling operations and the like.

As set forth above, a control similar to the one disclosed is employed for actuating drive screw 38 to which the drill gantry is drivingly connected. An identical arrangement of coarse, medium and fine channels is provided for very accurately positioning the drill gantry along the length of the drill mounting carriage in response to error signals which represent the difference between the instantaneous and desired positions of the drill gantry. In both of the controls for the drill mounting carriage and the drill gantry the very precise and accurate "Inductosyn" units in combination with the drive screws and the ball follower assemblies allow the operative drill unit to be accurately positioned with respect to a working point on the workpiece receiving table.

It should thus be apparent that the objects initially set forth have been accomplished. There is disclosed an automatic drilling machine which embodies features of construction and control means which allow very precise and accurate drilling and other like machining operations to be performed on large area workpieces. Although a preferred illustrated embodiment of the invention has been disclosed it is apparent that many changes may be made therein without departing from the clear teachings of the invention. Accordingly, reference should be had to the following appended claims in determining the true scope and intent of the invention.

I claim:

1. A machine tool of the type adapted to complete machining operations on large area workpieces comprising a supporting base, a workpiece receiving table, means supporting said workpiece supporting table in vertically spaced relation with respect to said supporting base, a tool gantry, said tool gantry having a large rectangular opening therein for receiving said workpiece receiving table, a tool unit mounted on said tool gantry, means for movably mounting said tool gantry from said supporting base whereby relative movement between said workpiece receiving table and said tool gantry is afforded;

and said tool gantry mounting back-up means engaging and extending across said workpiece supporting table to support the same against deflection adjacent said tool unit.

2. A machine tool of the type adapted to complete machining operations on large area workpieces comprising a supporting base, a workpiece receiving table, means supporting said workpiece supporting table in vertically spaced relation with respect to said supporting base, a tool gantry, said tool gantry having a large rectangular opening therein for receiving said workpiece receiving table, a tool unit mounted on said tool gantry, means for movably mounting said tool gantry from said supporting base whereby relative movement between said workpiece receiving table and said tool gantry is afforded, and said tool gantry carrying a back-up roll adjacent said opening, and said back-up roll engaging said workpiece supporting table to support the same against deflection adjacent said tool unit.

3. A machine tool of the type adapted to complete machining operations on large area workpieces comprising a supporting base, a workpiece receiving table, means supporting said workpiece supporting table in vertically spaced relation with respect to said supporting base, a tool gantry, said tool gantry having a large rectangular opening therein for receiving said workpiece receiving table, a tool unit mounted on said tool gantry, means for movably mounting said tool gantry from said supporting base whereby relative movement between said workpiece receiving table and said tool gantry is afforded, said means for movably mounting comprising a plurality of spaced parallel rails mounted on said supporting base, spaced pairs of anti-friction rollers mounted from said tool gantry engaging at least a portion of said rails, said plurality of rails comprising a pair of side rails positioned adjacent the side edges of said supporting base and a center rail disposed between said side rails, said center rail having a groove in the top surface thereof throughout its length, an elongated slide mounted from said tool gantry, and said slide being received within said groove and guiding said tool gantry for movement.

4. A machine tool of the type adapted to complete machining operation on large area workpieces comprising a supporting base, a tool gantry, a tool unit mounted on said tool gantry, means for movably mounting said tool gantry from said supporting base for movement therealong, said means for movably mounting comprising an elongated rail mounted on said supporting base, said elongated rail being disposed centrally of said supporting base in upwardly facing relation, a groove in the top surface of said elongated rail extending primarily the length of said supporting base, an elongated slide mounted from said tool gantry, said elongated slide being disposed at the bottom and centrally of said tool gantry in downwardly facing relation, and said elongated slide being received in said groove in said rail for guiding said tool gantry for movement.

5. Apparatus according to claim 4 further characterized in that said elongated rail has a pair of outwardly directed flanges projecting from the sides of said groove, said flanges extending primarily the length of said supporting base, and a plurality of anti-friction rollers mounted from said tool gantry on opposite sides of said elongated slide engaging said flanges for anti-frictionally supporting said tool gantry.

6. Apparatus according to claim 4 characterized in that said means for movably mounting further comprises a pair of side rails mounted on said supporting base, said side rails being disposed on opposite sides of said first mentioned rail in parallel relation thereto adjacent the ends of said tool gantry, and a plurality of anti-friction roller mounted from said tool gantry engaging said side rails whereby said gantry is supported against vertical deflection adjacent its ends and is mounted for movement along said supporting base.

7. A machine tool of the type adapted to complete machining operations on large area workpieces comprising a workpiece receiving table, a tool gantry, said tool gantry having a large opening therein for receiving said workpiece receiving table, means mounting said tool gantry for movement along said workpiece receiving table, a tool mounting carriage, means mounting said tool mounting carriage on said tool gantry for movement thereacross, a tool backer mounting carriage, means mounting said tool backer mounting carriage on said tool gantry for movement thereacross, said means mounting said tool mounting carriage comprising a threaded shaft extending across said tool gantry above said opening, follower means carried by said tool mounting carriage engaging said threaded shaft, said means mounting said tool backer mounting carriage comprising a second threaded shaft extending across said tool gantry below said opening, second follower means carried by said tool backer mounting carriage engaging said second threaded shaft, a motor mounted on said tool gantry, and drive means interconnecting said motor with said first mentioned threaded shaft and said second threaded shaft whereby said tool mounting carriage and said backer tool mounting carriage are moved is exact synchronism upon actuation of said motor.

8. A machine tool of the type adapted to complete machining operations on large area workpieces comprising a workpiece receiving table, a tool gantry, said tool gantry having a large opening therein for receiving said workpiece receiving table, means mounting said tool gantry for movement along said workpiece receiving table, a tool mounting carriage, means mounting said tool mounting carriage on said tool gantry for movement thereacross, a plurality of tool units, means mounting said plurality of tool units for sliding movement en masse on said tool mounting carriage, and means mounting each of said tool units on said tool mounting carriage for independent vertical movement.

9. A machine tool of the character described comprising a tool gantry, a tool mounting carriage mounted for sliding movement across said tool gantry, a plurality of tool units, means mounting said tool units on said tool mounting carriage for vertical adjustment en masse, means mounting said tool units on said tool mounting carriage for limited movement en masse in the plane of travel of said tool mounting carriage, and means mounting each of said tool units on said tool mounting carriage for independent vertical movement.

10. Apparatus according to claim 9 further characterized in that means mounting said tool units on said tool mounting carriage for vertical adjustment en masse comprises a carriage member having a recess therein, an insert received in said recess, a threaded shaft journaled by said insert, a lifting nut received on said threaded shaft, means guiding said lifting nut for vertical movement, and a relatively stationary tool slide guide attached to said lifting nut.

11. Apparatus according to claim 10 further characterized in that said means mounting said tool units for limited movement en masse comprises a tool slide mounted for longitudinal sliding movement with respect to said tool slide guide, a longitudinally movable mounting member disposed between said tool slide guide and said tool slide, and actuating means for moving said tool slide and said mounting member relative to each other to slidably move said tool units.

12. Apparatus according to claim 11 further characterized in that said means mounting each of said tool units on said tool mounting unit for independent vertical adjustment comprises a plurality of vertical ways formed in said tool slide, tool mounting blocks slidably received in said ways, means to move said tool mounting blocks in said ways, and said tool units being received in said tool mounting blocks.

13. A machine tool of the character described comprising a tool gantry, a tool mounting carriage mounted for longitudinal movement across said tool gantry, a plurality of drill units, means mounting said drill units on said tool mounting carriage for limited longitudinal sliding movement, said last mentioned means comprising a relatively stationary tool slide guide, a relatively movable tool slide mounted for longitudinal movement with respect to said tool slide guide, a relatively movable mounting member disposed between said tool slide guide and said tool slide, actuating means for moving said tool slide and said mounting member relative to each other to slidably move said tool units.

14. Apparatus according to claim 13 further characterized in that said actuating means comprises a pair of fluid cylinders mounted in back-to-back relation on opposite sides of said mounting member, one of said cylinders having its piston rod connected to said relatively stationary tool slide guide, and the other of said cylinders having its piston rod connected to said relatively movable tool slide.

15. Apparatus according to claim 13 further characterized in that said mounting member has an abutment surface thereon, said tool slide mounting adjustable limiting means movable therewith, and said limiting means engaging said abutment surface to limit longitudinal movement of said drill units in either direction upon energization of said actuating means.

16. A machine tool of the type adapted to complete accurate machining operations on large area workpieces comprising a large generally rectangular supporting base, a large generally rectangular workpiece receiving table, means supporting said workpiece supporting table in vertically spaced overlying relation with respect to said supporting base, a vertically extending tool gantry, said tool gantry having a generally rectangular large center opening therein, said tool gantry having a bottom wall, a top wall and a pair of spaced end walls, a tool unit mounted from said tool gantry, said center opening of said tool gantry receiving said workpiece receiving table, said bottom wall of said tool gantry being disposed in nesting relation between said supporting base and said workpiece receiving table, and means for movably supporting said tool gantry to allow relative movement between said tool gantry and said workpiece receiving table.

17. Apparatus according to claim 16 further characterized in that said means for movably supporting comprises a pair of side rails mounted on said supporting base, said pair of side rails being disposed on opposite sides of said supporting base adjacent said end walls of said tool gantry, and follower means extending from the ends of said tool gantry and engaging said pair of rails whereby said tool gantry is supported against vertical deflection adjacent its ends and is mounted for movement along said supporting base.

18. A machine tool of the type adapted to complete machining operations on large area workpieces comprising a supporting base, a workpiece receiving table, means supporting said workpiece receiving table in vertically spaced overlying relation with respect to said supporting base, a tool gantry, said tool gantry having an enclosed large rectangular opening therein for receiving said workpiece receiving table, a tool unit mounted on said tool gantry, means for movably mounting said tool gantry from said supporting base, said means for movably mounting comprising a pair of side rails mounted on said supporting base, said pair of side rails being disposed on opposite sides of said supporting base in upwardly projecting relation adjacent the ends of said tool gantry, and follower means extending downwardly from the ends of said tool gantry and engaging said pair of side rails whereby said tool gantry is supported against vertical deflection adjacent its ends and is mounted for movement along said supporting base.

19. Apparatus according to claim 18 further characterized in that said means for movably mounting comprises an elongated center rail mounted on said supporting base, said center rail being disposed between and extending parallel with respect to said pair of side rails, said center rail having an upwardly opening groove throughout the length thereof, an elongated slide mounted from said tool gantry in downwardly facing relation, and said slide riding in said groove to support and guide said tool gantry.

20. Apparatus according to claim 19 characterized in that said means for movably mounting further comprises a threaded shaft extending the length of and journaled from said supporting base, said threaded shaft being disposed in adjacent parallel relation with respect to said center rail, a ball follower assembly mounted from said tool gantry adjacent said elongated slide, said ball follower assembly engaging said threaded shaft, and means to rotate said shaft.

References Cited in the file of this patent
UNITED STATES PATENTS

| 2,508,281 | Miller et al. | May 16, 1950 |
| 2,854,114 | Hillyer et al. | Sept. 30, 1958 |

FOREIGN PATENTS

| 240,017 | Germany | Oct. 26, 1911 |
| 143,726 | Australia | Oct. 9, 1951 |